US008794959B2

(12) United States Patent
Grimes et al.

(10) Patent No.: US 8,794,959 B2
(45) Date of Patent: *Aug. 5, 2014

(54) COMPLETELY DISPOSABLE COOKING APPARATUS FOR FILLING AND DECORATING OF FOODS

(76) Inventors: Brenda Marie Grimes, Estero, FL (US); Charles Wilson Grimes, Darien, CT (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/184,021

(22) Filed: Jul. 15, 2011

(65) Prior Publication Data

US 2013/0017297 A1      Jan. 17, 2013

(51) Int. Cl.
*A23G 3/02* (2006.01)
*A23G 3/28* (2006.01)
*B65D 81/32* (2006.01)

(52) U.S. Cl.
CPC .................... *B65D 81/32* (2013.01); *Y10S 425/044* (2013.01)
USPC .......... 425/466; 425/87; 425/380; 425/382.4; 425/467; 425/DIG. 44; 222/96; 222/206; 222/212; 222/214; 222/494; 426/115; 426/516; 426/517

(58) Field of Classification Search
CPC ...... B29C 47/12; B29C 47/124; B29C 47/20; B29C 47/22; B29C 47/28; A23P 1/12
USPC ............... 425/461, 465, 466, DIG. 44, 376.1, 425/381.2, 382.4, 87, 380, 467; 426/115, 426/516, 517; 222/92, 93, 95, 105, 107, 222/206, 212, 214, 494, 566
See application file for complete search history.

(56) References Cited

U.S. PATENT DOCUMENTS 1,587,241 A  *  6/1926  Robenalt ..................... 425/376.1
2,099,412 A  *  11/1937  Seidler .......................... 222/107

(Continued)

FOREIGN PATENT DOCUMENTS

WO    2004/049816  A1    6/2004
WO    2005/115162  A1    12/2005
WO    2007/090588  A1    8/2007

OTHER PUBLICATIONS

"Pastry Bag Support", Kitchen Krafts, The FoodCrafter's Supply Catalog, retrieved date Jan. 2, 2011, retrieved from URL:http://www.kitchenkrafts.com/product.asp?pn-CD3013&utm_medium=shoppingengine*utm_source=shopzilla&sid=Shopzilla&tid=CSE, 1pg.

(Continued)

*Primary Examiner* — Seyed Masoud Malekzadeh
(74) *Attorney, Agent, or Firm* — Buckley, Maschoff & Talwalkar LLC (57) ABSTRACT

A completely disposable cooking apparatus used for filling and decorating of foods, that is a one-piece disposable construction, comprising a one-piece, funnel-shaped bag with a soft side wall, having an open first end at the "top" or wider end of the funnel through which food material can be inserted into the bag and a closed second end at the "bottom" or narrow end of the funnel, with an integral, malleable, conical shaped, discharge orifice (also sometimes referred to as a nozzle or a tip). The orifice has serrations or ridges extending inwardly from the internal wall of the orifice, running longitudinally or parallel to the cone axis for all or a part of the length of the orifice. The orifice can either be initially closed or manufactured with a small opening or hole. The orifice is made of a material so that it is capable of being cut at any point along its longitudinal axis to yield an exit opening or hole with a desired size. Regardless of the point of cut, i.e., regardless of the size of the hole or opening, the inwardly extending serrations or ridges that remain after the cut insure that the material is "treated" as it is expelled from the bag through the orifice. While the orifice is capable of "treating" the material as it is discharged from the bag, the orifice is also either: (a) elastic or flexible enough in order to allow the hole or opening in the orifice to expand to pass "clogs" or "lumps" and then return to its original shape; or (b) supple or deformable enough in order to allow the orifice to be compressed or collapsed "upstream" of the hole or opening so that the "clogs" or "lumps" can be broken up and then passed through the hole or opening when the orifice returns to its original shape.

42 Claims, 8 Drawing Sheets

(56) References Cited

U.S. PATENT DOCUMENTS

| | | | | |
|---|---|---|---|---|
| 2,157,891 A * | 5/1939 | Godfrey | ............. | 222/519 |
| 2,320,496 A * | 6/1943 | Wechsler | ............. | 425/461 |
| 2,441,649 A * | 5/1948 | Sprague | ............. | 222/92 |
| 2,620,756 A * | 12/1952 | Krens | ............. | 425/191 |
| 2,723,779 A * | 11/1955 | Parker et al. | ............. | 222/104 |
| 2,959,327 A | 11/1960 | Bloom | | |
| 3,123,259 A * | 3/1964 | Musel et al. | ............. | 222/521 |
| 3,134,832 A * | 5/1964 | Smith | ............. | 264/167 |
| 3,157,312 A * | 11/1964 | Kitterman | ............. | 222/1 |
| 3,285,479 A * | 11/1966 | Porter et al. | ............. | 222/521 |
| 3,847,523 A * | 11/1974 | Parrish et al. | ............. | 425/191 |
| 4,574,987 A * | 3/1986 | Halligan et al. | ............. | 222/107 |
| 4,585,149 A * | 4/1986 | Zulauf | ............. | 222/94 |
| 4,598,844 A | 7/1986 | Morris | | |
| 4,813,862 A * | 3/1989 | Bowers et al. | ............. | 425/87 |
| 4,844,917 A | 7/1989 | DeLorimiere | | |
| 4,961,517 A * | 10/1990 | Tkac | ............. | 222/94 |
| 5,114,044 A * | 5/1992 | Spanek, Jr. | ............. | 222/94 |
| 5,222,630 A * | 6/1993 | Burtis | ............. | 222/107 |
| 5,248,071 A | 9/1993 | Ray | | |
| 5,366,116 A * | 11/1994 | Burtis | ............. | 222/107 |
| 5,538,050 A * | 7/1996 | Galdon | ............. | 141/10 |
| 5,758,802 A * | 6/1998 | Wallays | ............. | 222/212 |
| 5,787,947 A | 8/1998 | Hertsgaard | | |
| 5,823,387 A * | 10/1998 | Manadanas et al. | ............. | 222/1 |
| 5,931,346 A * | 8/1999 | Wallays | ............. | 222/107 |
| 6,065,651 A * | 5/2000 | Tedeschi et al. | ............. | 222/519 |
| 6,179,165 B1 * | 1/2001 | Knight et al. | ............. | 222/107 |
| 6,273,307 B1 * | 8/2001 | Gross et al. | ............. | 222/566 |
| 6,386,395 B1 * | 5/2002 | Lunghetti | ............. | 222/213 |
| 7,021,505 B2 * | 4/2006 | Franczyk | ............. | 222/541.1 |
| 7,478,736 B2 * | 1/2009 | Morgan | ............. | 222/107 |
| D606,882 S | 12/2009 | Sharp et al. | | |
| 7,654,402 B2 * | 2/2010 | Kusuma et al. | ............. | 220/8 |
| 8,201,709 B1 * | 6/2012 | Namigata et al. | ............. | 222/105 |
| 2003/0044482 A1 * | 3/2003 | Stachowicz et al. | ............. | 425/208 |
| 2003/0206990 A1 * | 11/2003 | Edmondson et al. | ............. | 425/466 |
| 2005/0170051 A1 * | 8/2005 | Folkmar | ............. | 426/115 |
| 2007/0131713 A1 | 6/2007 | Hill | | |
| 2008/0041878 A1 * | 2/2008 | Day et al. | ............. | 222/95 |
| 2009/0127287 A1 * | 5/2009 | Faller | ............. | 222/107 |

OTHER PUBLICATIONS

"Disposable Decorating Bags & Nozzles", Hutzler, retrieved date Jan. 2, 2011, retrieved from URL:http://www.hutzlerco.com/products/i/246/, 1pg.

"Notification of Transmittal of the International Search Report and the Written Opinion of the International Searching Authority, or the Declaration", dated Sep. 28, 2012, for International Application No. PCT/US2012/046393, 27pgs.

* cited by examiner

COMPLETELY DISPOSABLE COOKING APPARATUS FOR FILLING AND DECORATING OF FOODS

BACKGROUND OF THE INVENTION

The EASY FILL BAG™ ("EFB") apparatus of this invention "resembles" a commonly used, prior art "Disposable Decorating Bag" ("DDB"), such as those manufactured and sold by Wilton Brands, Inc., Hutzler Manufacturing Co., Inc. and Kitchen Krafts, Inc.

However, there are significant differences between the EFB apparatus of this invention and the previous DDB apparatus, both in terms of construction and manner of operation.

The typical DDB apparatus is a multi-piece construction, including a bag, a non-disposable rigid decorating tip with treatment means at the annular discharge end of the tip and a coupler and coupler collar. Typical DDB tips are made of metal or rigid white plastic and the coupler and coupler collar are made of rigid white plastic.

In order to use the DDB apparatus, a DDB bag is assembled with a desired decorating tip (i.e., with the desired opening size and treatment means at the annular end) using a coupler and coupler collar.

The ability to have different sized discharge openings with a DDB apparatus necessitates the user having a selection of different tips.

If, after initial use, the user decides a larger size opening is desired, the user must disassemble the DDB apparatus and reassemble the DDB apparatus with a new tip.

During use of the DDB apparatus, if the selected tip becomes "clogged," i.e., if the material being expelled out of the DDB apparatus through the tip has a "lump" that gets "stuck" in the tip, the bag and tip must be disassembled so that the tip can be accessed and cleaned.

Once use of the DDB apparatus is completed, the DDB apparatus is taken apart, the bag is disposed of, and the tip, coupler and coupler collar are cleaned and stored away for future use.

The EFB apparatus of this invention, on the other hand, in the preferred embodiment, is a one-piece, fully disposable construction, comprising a funnel-shaped bag with an integral, flexible, conical shaped discharge orifice at the end for "treating" material being expelled from the bag through the end. The discharge orifice has protrusions, serrations or ridges extending inwardly from the internal wall of the orifice and running longitudinally or parallel to the conical axis, along all or a part of the length of the discharge orifice. The orifice is made of a material so that it is capable of being cut at any point along its longitudinal dimension or along its conical axis to yield an exit opening or hole with a desired size or cross-sectional dimension. Regardless of the point of cut, i.e., regardless of the size of the hole or opening or the cross-sectional dimension, the inwardly extending serrations or ridges that remain insure that the material is "treated" as it is expelled from the bag through the orifice. While the orifice at the end of an EFB apparatus is capable of "treating" the material as it is discharged from the bag, the orifice is also either: (a) elastic or flexible enough in order to allow the hole or opening in the orifice to expand to pass "clogs" or "lumps" and then return to its original shape; or (b) supple or deformable enough in order to allow the orifice to be compressed or collapsed "upstream" of the hole or opening so that the "clogs" or "lumps" can be broken up and then passed through the hole or opening when the orifice returns to its original shape.

In an alternative embodiment, the EFB apparatus of this invention has sections of the orifice with protrusions, serrations or ridges extending inwardly from the internal wall of the orifice and running longitudinally or parallel to the conical axis and longitudinal sections without protrusions, serrations or ridges so that the orifice can be cut at one of those areas and used as a piping bag.

Prior art patents have issued for a number of decorating, dispensing and icing bags, none of which disclose the unique features or advantages of the EFB apparatus of this invention. Prior art patents noted but not believed to be relevant to the novelty or non-obviousness of the current invention include: Parker et al. U.S. Pat. No. 2,723,779; DeLorimiere U.S. Pat. No. 4,844,917; Tkac U.S. Pat. No. 4,961,517; Wallays U.S. Pat. No. 5,758,802; Wallays U.S. Pat. No. 5,931,346; Tedeschi, Jr. et al. U.S. Pat. No. 6,065,651; Gross et al. U.S. Pat. No. 6,273,307 B1; Lunghetti U.S. Pat. No. 6,386,395 B1; Franczyk U.S. Pat. No. 7,021,505 B2; Folkmar PCT No. WO 2004/049816 A1; Ejeblad PCT No. WO 2005/115162 A1; and Ejeblad PCT No. WO 2007/090588 A1.

In the absence of the availability of EFB apparatus as disclosed herein, individuals have been known to take readily available ZIPLOC® and GLAD® zipper plastic bags, fill them with food material and cut the corner of the bag in order to create "homemade" disposable decorating bags with a "dispensing hole." Such "homemade" bags are unsatisfactory for several reasons, most notably because: (i) they do not permit the "treatment" of the material as it exits the "hole"; (ii) the lack of an orifice prevents the desired controlled delivery of the food material; and (iii) there are inadequate means for dealing with lumps in the food material and the forced passage of the lumps out of the bag typically causes the opening of the bag to permanently widen, such that thereafter the food material is dispensed at an undesirable flow rate or worse, for the bag to no longer function.

SUMMARY OF THE INVENTION

The EASY FILL BAG™ ("EFB") apparatus of this invention in a preferred embodiment is a one-piece disposable construction, comprising a funnel-shaped bag with a soft side wall, having an open first end at the "top" or wider end of the funnel through which food material can be inserted into the bag and a closed second end at the "bottom" or narrow end of the funnel, with an integral, malleable, conical shaped, discharge orifice. The conical shaped orifice has protrusions, serrations or ridges extending inwardly from the internal wall of the orifice and running longitudinally or parallel to the conical axis, along all or a part of the length of the conical shaped orifice. The orifice can either be initially closed or provided with a small opening or hole. The orifice is made of a material so that it is capable of being cut at any point along its longitudinal axis to yield an exit opening or hole with a desired size or cross-sectional dimension. Regardless of the point of cut, i.e., regardless of the size of the hole or opening or cross-sectional dimension, in the preferred embodiment, the inwardly extending serrations or ridges that remain insure that the material is "treated" as it is expelled from the bag through the orifice. While the orifice at the end of an EFB apparatus is capable of "treating" the material as it is discharged from the bag, the orifice is also either: (a) elastic or flexible enough in order to: (a)(i) allow the orifice to "open up" or "expand" so that "clogs" or "lumps" can pass through the orifice while still "treating" the material being passed therethrough; and (a)(ii) cause the orifice to return to its original shape after the "clog" or "lump" has passed in order to continue to "treat" material that subsequently passes through the orifice; or (b) supple or deformable enough in order to: (b)(i) allow the orifice to be compressed or collapsed so that the "clogs" or "lumps" can be broken up so that they can pass through the orifice; and (b)(ii) cause the orifice to return to its original shape after the "clog" or "lump" has been broken up in order to "treat" all of the material that passes through the orifice.

In one embodiment, the bag side wall is made of a temperature impervious material, which allows the user to work with a variety of materials, including very warm and very cold materials.

In another embodiment the bag side wall has texturing to facilitate gripping by the user.

In an alternative embodiment, the EFB orifice of this invention is provided without being attached to an integral bag, but rather, with a mating collar, and the EFB orifice is affixed to a bag in the manner of a traditional DDB apparatus, such that the benefits and features of this invention are achieved albeit at a slightly higher price and without the convenience of the integral one-piece completely disposable design.

In still a further embodiment, the EFB apparatus is used in combination with a stand that engages and supports the EFB apparatus during filling. More particularly, the EFB apparatus can be supported by mating mechanisms on the EFB apparatus and the stand, e.g., three "support holes" along the "top" of the EFB apparatus that "attach" to fingers of the EFB stand, or an excess of EFB side wall material that is reversible on itself for folding over arms of the EFB support stand. Using the EFB stand allows the user to fill the bag easily with both hands free.

The EFB apparatus of this invention can be used for piping, decorating, filling, assembling and dispensing the food material in connection with any number of other cooking and baking activities without departing from the scope of this invention, e.g., cakes and cupcakes, stuffed shells, manicotti, cannoli's, deviled eggs, stuffed mushrooms, twice baked potatoes, cookies, canapes, pastry cups, meringue, etc.

The EFB apparatus comes in a variety of sizes, with "larger" EFB apparatus having larger bags and comparatively larger orifices.

The EFB apparatus is completely disposable once use of it is complete.

The EFB apparatus of this invention will be packaged and sold like reusable, re-sealable zipper storage bags, such as the ZipLock® bags originally developed by Dow Chemical Company and now produced by S.C. Johnson & Son or Glad® bags produced by The Glad Products Company.

Each box (or each "starter box") of the EFB apparatus of this invention may include an apparatus stand, which will enable the user to attach each of the EFB apparatus in the box upright on the stand for ease of filling.

An object of the disclosed invention is to provide individuals with bags that have an integral unique discharge orifice (also sometimes referred to as a nozzle or a tip) that can be used to dispense treated food material and then completely disposed of.

A further object of the disclosed invention is to provide individuals with bags, the universal orifice of which can be cut to a desired hole or opening size, while still retaining the treatment capacity of the orifice.

A further object of the disclosed invention is to provide individuals with bags, the orifice of which is made of a malleable material such that "clogs" or "lumps" do not clog the orifice.

A still further object of the disclosed invention is to provide individuals with bags, the orifice of which is made of a sufficiently elastic material so that the orifice can expand to allow "clogs" or "lumps" to pass through the orifice and the orifice can then return to its original shape.

A still further object of the disclosed invention is to provide individuals with bags, the orifice of which is made of a sufficiently deformable material so that the orifice can be collapsed to break up "clogs" or "lumps" so that they can pass through the orifice and the orifice can return to its original shape.

A still further object of the disclosed invention is to provide individuals with bags, the orifices of which have a star-shaped cross section along its longitudinal length.

A still further object of the disclosed invention is to provide individuals with bags, the orifices of which have cutting guides that can be indicated by scoring or coloring applied to the outside wall of the orifice and corresponding to a preset orifice hole or exit opening size.

A still further object of the disclosed invention is to provide individuals with bags with universal orifices, so that the bags can be interchangeably used both for dispensing food material that has been "treated" with a design and for dispensing food material that can be used for "piping."

A still further object of the disclosed invention is to provide individuals with bags, inside of which color delivery means allows color to be added to the food material as it is forced out of the EFB apparatus.

A yet further object of the disclosed invention is to provide individuals with bags, the nozzle of which is made out of material with a durometer of between 27A and 60A.

A yet further object of the disclosed invention is to provide individuals with bags, the orifice of which is made out of a material that is elastic, such as a thermoset elastomer, such as latex rubber or silicone rubber, or a thermoplastic elastomer, such as polyurethane.

A yet further object of the disclosed invention is to provide individuals with bags, the orifice of which is made out of a material that is flexible, but not elastic, such as a thermoplastic such as polyethylene.

A yet further object of the disclosed invention is to provide individuals with bags, where the orifice can be cut to afford a bag opening with an internal diameter of up to 0.8 inches.

A yet further object of the disclosed invention is to provide individuals with bags, the soft side of which is made from polyethylene that can be welded to the orifice material.

A yet further object of this invention is to provide individuals with universal orifices and mating clamping mechanisms, that can be used with traditional bags, which orifices can be both cut to a desired hole or opening size while still retaining the treatment capacity of the orifice, or cut to a different desired hole or opening size for piping purposes, and where such orifice is made of a malleable material such that "clogs" or "lumps" do not clog the orifice.

BRIEF DESCRIPTION OF THE FIGURES

FIGS. 12-16 depict a wire stand for use in combination with an EFB apparatus of this invention.

DETAILED DESCRIPTION OF THE INVENTION

The EASY FILL BAG™ ("EFB") apparatus of this invention can be used with a variety of viscous foodstuffs, including to assemble, fill and prepare a variety of foods, such as stuffed shells, manicotti, cannoli's, deviled eggs, stuffed mushrooms, 2× baked potatoes, cookies, canapes, pastry cups, meringue, etc., and to decorate with icing and the like.

In a preferred embodiment, the EFB apparatus is a completely disposable, one-piece construction, comprising a bag with an integral, flexible discharge orifice at the end for "treating" material being expelled from the bag through the end.

To create an aesthetic design in the dispensed material, the EFB apparatus includes an integral orifice in the end that has jagged inwardly facing edges or protrusions, ridges or serrations that "treat" the material as it passes through the orifice.

While the orifice at the end of an EFB apparatus is capable of "decorating" the material as it is discharged from the bag, the orifice is also flexible or supple enough in order to: (i) allow the orifice to "open up" or "expand" so that "clogs" or "lumps" can pass through the orifice; and (ii) cause the orifice to return to its original shape after the "clog" or "lump" has passed in order to "treat" material that subsequently passes through the orifice.

The EFB bag can be made of a material that inhibits the transfer of heat or cold from the contents of the bag through to the user's hands.

The EFB bag can be made with a textured exterior surface so as to facilitate the user's gripping of the EFB bag.

Once use of the EFB apparatus is completed, it is the intention of this invention that the entire one-piece EFB apparatus is disposed of.

The EFB apparatus comes in several sizes, with larger EFB apparatus having larger bags and respectively larger integral, flexible discharge orifices.

The EFB apparatus comes with a stand that engages and supports the EFB bag during filling. More particularly, the EFB apparatus can be supported by mating mechanisms on the EFB bag and the stand, e.g., "support holes" in the EFB bag that "attach" to fingers of the EFB stand, or an excess of EFB bag material that is reversible on itself for folding over arms of the EFB support stand.

EFB apparatus will be packaged and sold like reusable, re-sealable zipper storage bags, such as the ZipLock® bags originally developed by Dow Chemical Company and now produced by S.C. Johnson & Son, or the Glad® bags sold by The Glad Products Company.

It is envisioned that a "starter" box of EFB apparatus, or possibly every box of EFB apparatus, may include an apparatus stand, which will enable the user to attach each EFB bags upright on the stand for ease of filling.

In the preferred embodiment, the EFB apparatus includes a funnel shaped bag for easy filling, handling, decorative dispensing, and disposing.

The choice of discharge orifice (or nozzle) material may be driven to some extent by the target cost of the product. Whatever the material is, it must enable the user to clear clogs without taking the food out of the bag, either by expanding to allow the clog to pass (preferred) or allowing the user to crush and break up the clog (preferred and alternate).

In an alternative embodiment, the discharge orifices (or nozzles) of the EFB apparatus are sold separately, i.e., without an attached bag, but rather, with a mating connection mechanism, such as a collar, so that the EFB orifice and mating connection mechanism can be attached to a traditional bag of any size.

Referring now to the figures, FIGS. 1-4 show a first, preferred embodiment of an EFB apparatus in accordance with this invention.

Figures 1, 2:
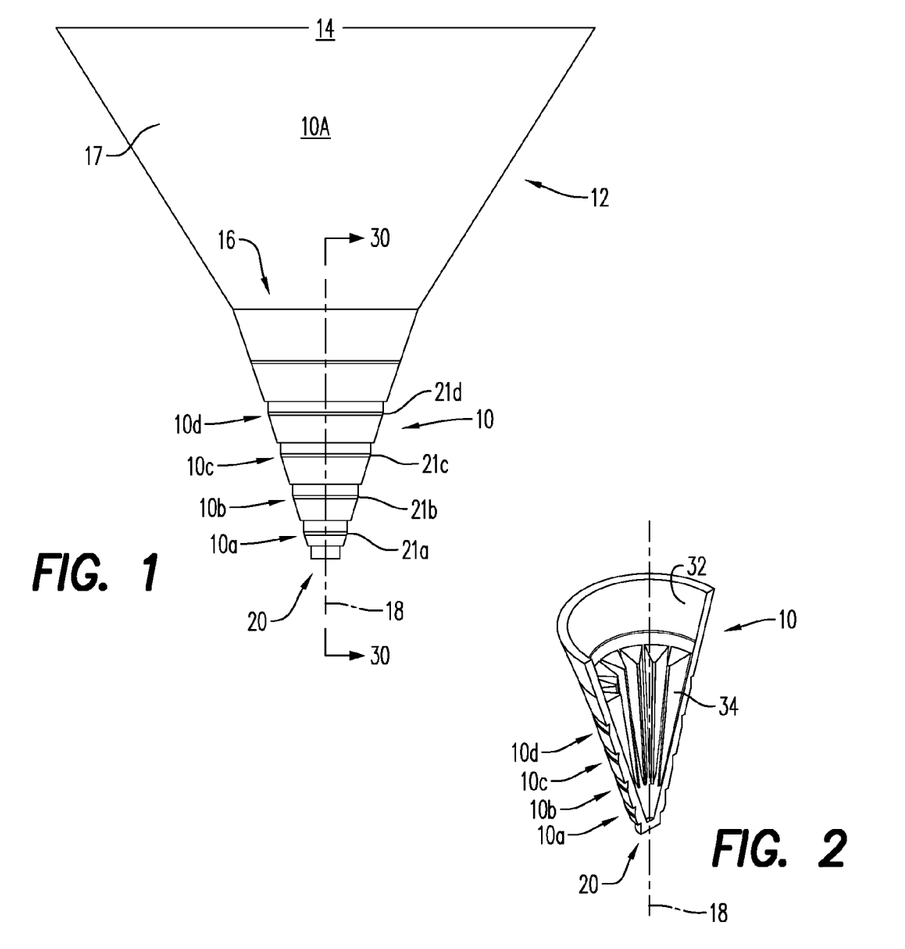
FIG. 1 depicts a side view of a first preferred embodiment of the apparatus disclosed herein.
FIG. 2 depicts a sectional view of the apparatus in FIG. 1.

In FIG. 1, a side view of the nozzle or discharge orifice 10 is shown, with an integral bag 12. The bag 12 is funnel shaped and the bag 12 is either attached to the nozzle 10 during manufacture, as a simultaneously created one piece construction, or the bag 12 is attached to the nozzle 10 in a secondary operation, e.g., by making the nozzle first, for example, by injection molding, and then by dip molding the bag over it, or by welding, gluing or connecting the nozzle and bag together by other means available and known in the art, including by using a disposable connection mechanism. The bag 12 has a first end 14 that is at the "top" or wider end of the funnel shape that is "open" and through which the food material 10A can be inserted into the bag 12, a second end 16 that is at the "bottom" or narrow end of the funnel shape that is "closed" as a result of the attachment of the nozzle 10, and a soft side wall 17 that allows the user to squeeze the bag 12 and cause food material 10A in the bag 12 to be expelled out of the bag 12 through the nozzle 10. The nozzle 10 is malleable and conical shaped and has a conical axis 18 and a discharge opening or hole 20. The sections 10a, 10b, 10c and 10d of the nozzle 10 are increasingly larger in cross-section and each respectively has a "cut line" 21a, 21b, 21c and 21d at which the nozzle 10 can be cut prior to or during use to achieve different the desired different opening or hole 20.

FIG. 2 shows a cut away view of the nozzle 10 of FIG. 1, taken along the line 30-30 in FIG. 1. The elements of the nozzle 10 seen in FIG. 1 that are still visible in FIG. 2 are similarly numbered. FIG. 2 additionally shows the internal wall 32 of the nozzle 10 and the protrusion, serrations or ridges 34 that extend inwardly from said internal wall 32 and run longitudinally along the length of the nozzle 10, parallel to the conical axis 18. Thus it can be seen that regardless of whether the nozzle 10 is cut at "cut line" 21a, i.e., at a point close to the hole 20 and before the protrusions 34 begin, or at any of the other "cut lines" 21b, 21c or 21d, which would cause a portion of the protrusions 34 also to be cut, lengths of the protrusions 34 remain within the nozzle 10 that "treat" the food material 10A as it passes from the bag 12 through the nozzle 10 and out the hole 20.

Figure 3:
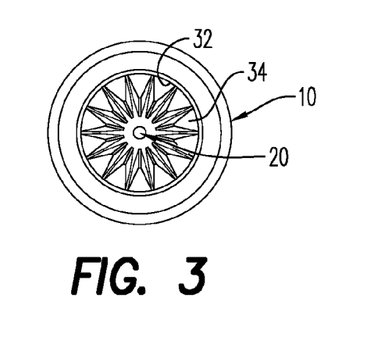
FIG. 3 depicts a top view of the apparatus in FIG. 1.

FIG. 3 is a top view of the nozzle 10 (as would be seen were one to look at the nozzle down into and through the bag 12). The protrusions 34 extending inwardly from the internal wall 32 create a star-shape that is imparted to the food material 10A as it passes through the nozzle 10 and is "treated" thereby.

Figure 4:
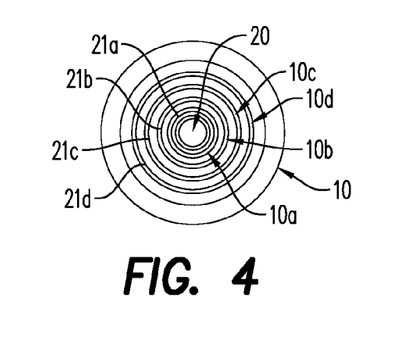
FIG. 4 depicts a bottom view of the apparatus in FIG. 1.

FIG. 4 is a bottom view of the nozzle 10 before any cut has been made, showing all of the sections 10a, 10b, 10c and 10d and the cut lines 21a, 21b, 21c and 21d.

Either before or after the food material 10A is introduced into the bag 12, the user cuts the nozzle 10 at a desired cut line 21a, 21b, 21c or 21d to achieve a desired opening or hole 20 and controlled dispensation of the food material 10A out through the nozzle 10. If the user initially cuts at cut line 21b, sufficient length of protrusions 34 remain to "treat" the food material 10A as it passes through the nozzle 10. If a lump clogs the nozzle 10, the nozzle is malleable enough to allow the lump to "pass." The manner in which the nozzle 10 will "pass" the lump depends upon which of the two embodiments of the invention is being employed. If the nozzle 10 is elastic, it will expand upon the user's application of pressure to the bag 12 and the lump will be expelled and the nozzle 10 will return to its normal size and shape. Alternatively, if the nozzle 10 is plastic, it will allow the user to apply pressure to the lump upstream of the opening 20 by squeezing the nozzle, to thereby break up the lump. The broken up lump will then be able to pass through the opening 20 and the nozzle will return to its normal size and shape.

During use, if the user would like to increase the size of the opening or hole 20, the user can elect to make a further cut in the nozzle 10. For example, if the user made the first cut at line 21b as described above, the user can elect to make a further or second cut in the nozzle 10 at cut line 21c or at cut line 21d to achieve a desired larger opening or hole 20 and controlled dispensation of a greater amount of the food material 10A out through the nozzle 10. If the user cuts at cut line 21c or cut line 21d, sufficient length of protrusions 34 nevertheless still remains to "treat" the food material 10A as it passes through the nozzle 10. If a lump clogs the nozzle 10, the nozzle is still malleable enough to allow the lump to "pass." The manner in which the nozzle 10 will "pass" the lump still depends upon which of the two embodiments of the invention is being employed. If the nozzle 10 is elastic, it will still expand upon the user's application of pressure to the bag 12 and the lump will be expelled and the nozzle 10 will return to its normal size and shape. Alternatively, if the nozzle 10 is plastic, it will still allow the user to apply pressure to the lump upstream of the opening 20 by squeezing the nozzle, to thereby break up the lump. The broken up lump will then be able to pass through the opening 20 and the nozzle will return to its normal size and shape.

If the user needs to, additional material can be added to the bag 12. Once the user is finished, the entire EFB apparatus can be completely disposed of.

FIGS. 1-4 show a preferred embodiment of the EFB apparatus according to this invention where the protrusions 34 run the length of the nozzle 10. FIGS. 5-8 show an alternative embodiment where the protrusions 36 are sections strategically placed between the cut lines.

Figures 5, 6:
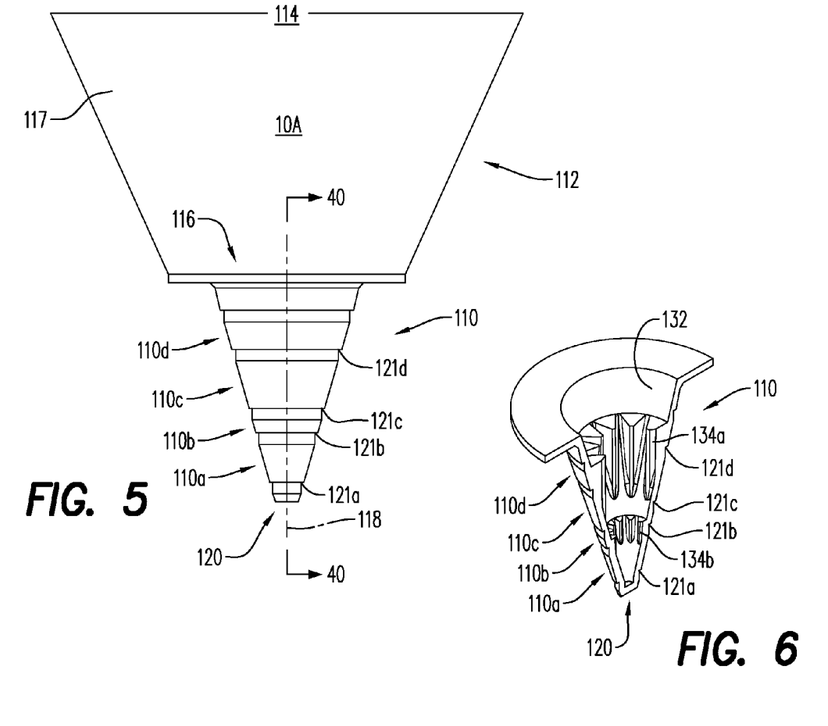
FIG. 5 depicts a side view of a second alternative embodiment of the apparatus disclosed herein.
FIG. 6 depicts a sectional view of the apparatus in FIG. 5.

In FIG. 5, a side view of an alternative nozzle or discharge orifice 110 is shown, with an integral bag 112. The bag 112 is funnel shaped and the bag 112 is either attached to the nozzle 110 during manufacture, as a simultaneously created one piece construction, or the bag 112 is attached to the nozzle 110 in a secondary operation, e.g., by making the nozzle first, for example, by injection molding, and then by dip molding the bag over it, or by welding, gluing or connecting the nozzle and bag together by other means available and known in the art, including by using a disposable connection mechanism. The bag 112 has a first end 114 that is at the "top" or wider end of the funnel shape that is "open" and through which the food material 10A can be inserted into the bag 112, a second end 116 that is at the "bottom" or narrow end of the funnel shape that is "closed" as a result of the attachment of the nozzle 110, and a soft side wall 117 that allows the user to squeeze the bag 112 and cause food material 10A in the bag 112 to be expelled out of the bag 112 through the nozzle 110. The nozzle 110 is malleable and conical shaped and has a conical axis 118 and a discharge opening or hole 120. The sections 110a, 110b, 110c and 110d of the nozzle 110 are increasingly larger in cross-section and each respectively has a "cut line" 121a, 121b, 121c and 121d at which the nozzle 110 can be cut prior to or during use to achieve different the desired different opening or hole 120.

The difference between the nozzle 10 and nozzle 110 is that, as best seen in FIG. 6 (a cut away view of the nozzle 110 of FIG. 5, taken along the line 40-40 in FIG. 5), depending upon where the cut is made in the nozzle 110, the opening 120 will end up being either an annular opening without protrusions 110 (i.e., if the cut is made at 121a or 121c) or an opening with the inwardly extending protrusions 134a (if the cut is made at 121d) or protrusions 134b (if the cut is made at 121b). The elements of the nozzle 110 seen in FIG. 5 that are still visible in FIG. 6 are similarly numbered. FIG. 6 additionally shows the internal wall 132 of the nozzle 110 and the protrusion, serrations or ridges 134a and 134b that extend inwardly from the internal wall 132 and run longitudinally for discrete sections along the length of the nozzle 110, parallel to the conical axis 118.

Figure 7:
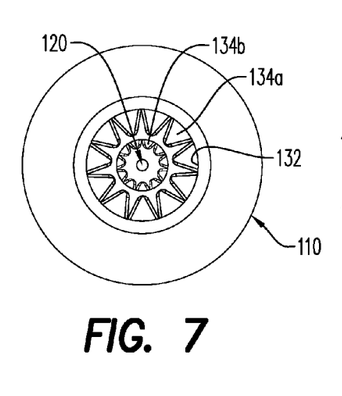
FIG. 7 depicts a top view of the apparatus in FIG. 5.

FIG. 7 is a top view of the nozzle 110 (as would be seen were one to look at the nozzle 110 down into and through the bag 112). The protrusions 134a and 134b extending inwardly from the internal wall 132 create two different star-shapes, one of which might be imparted to the food material 10A as it passes through the nozzle 110, depending upon the cut that is made in the nozzle 110, as described herein.

Figure 8:
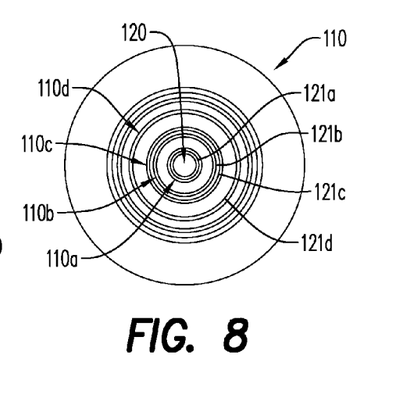
FIG. 8 depicts a bottom view of the apparatus in FIG. 5.

FIG. 8 is a bottom view of the nozzle 110 before any cut has been made, showing all of the sections 110a, 110b, 110c and 110d and the cut lines 121a, 121b, 121c and 121d.

As with the preferred embodiment, either before or after the food material 10A is introduced into the bag 112, the user cuts the nozzle 110 at a desired cut line 121a, 121b, 121c or 121d to achieve a desired opening or hole 120 and controlled dispensation of the food material 10A out through the nozzle 110. If the user initially cuts at cut line 121a or 121c, the food material 10A will pass through the resultant annular opening without any sort of design "treatment." If the user cuts the nozzle 110 at 121b or 121d, the protrusions 134b and 134 a, respectively, will "treat" the food material 10A as it passes through the nozzle 110.

Regardless of where the cut in the nozzle 110 is made, if a lump clogs the nozzle 110, the nozzle is malleable enough to allow the lump to "pass." The manner in which the nozzle 110 will "pass" once again depends upon which of the two embodiments of the invention is being employed. If the nozzle 110 is elastic, it will expand upon the user's application of pressure to the bag 112 and the lump will be expelled and the nozzle 110 will return to its normal size and shape. Alternatively, if the nozzle 110 is plastic, it will allow the user to apply pressure to the lump upstream of the opening 120 by squeezing the nozzle, to thereby break up the lump. The broken up lump will then be able to pass through the opening 120 and the nozzle will return to its normal size and shape.

During use of the alternative embodiment of FIGS. 5-8, if the user cuts the nozzle 110 at cut line 121b, the food material 10A will be "treated" by protrusions 134b as it is passed through the nozzle 110 and out of the opening 120. If the user would like to switch and have the food material 10A dispensed without treatment, e.g., for "piping," the user can elect to make a further or second cut at cut line 121c. Thereafter, the user can elect to make a still further or third cut in the nozzle 110 at cut line 121d so that the food material 10A will be "treated" by protrusions 134a as it is passed through the nozzle 110 and out of the opening or hole 120.

Regardless of where the user cuts the nozzle 110, if a lump clogs the nozzle 110, the nozzle 110 is still malleable enough to allow the lump to "pass." The manner in which the nozzle 110 will "pass" the lump still depends upon which of the two embodiments of the invention is being employed. If the nozzle 110 is elastic, it will still expand upon the user's application of pressure to the bag 112 and the lump will be expelled and the nozzle 110 will return to its normal size and shape. Alternatively, if the nozzle 110 is plastic, it will still allow the user to apply pressure to the lump upstream of the opening 120 by squeezing the nozzle 110, to thereby break up the lump. The broken up lump will then be able to pass through the opening 20 and the nozzle 110 will return to its normal size and shape.

The user can refill the bag 112 of the apparatus of alternate embodiment as needed and, once the user is finished, the entire EFB apparatus can be completely disposed of.

Figures 9, 10:
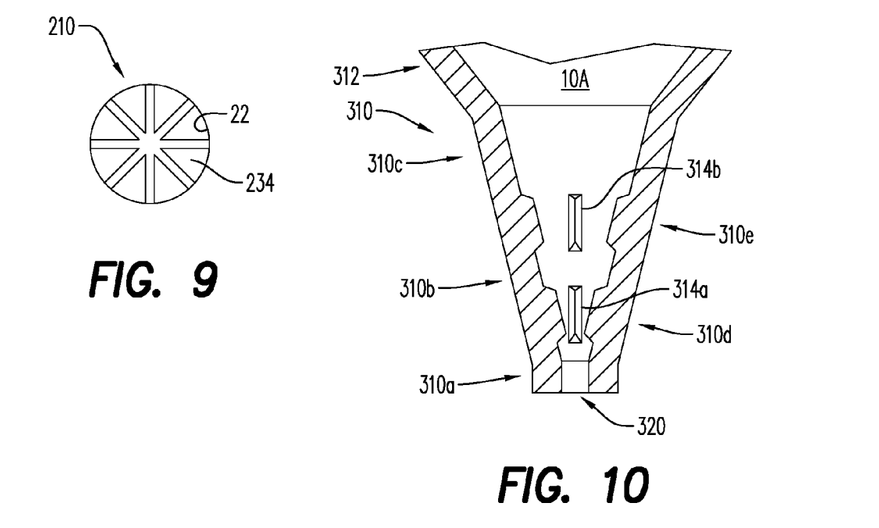
FIG. 9 depicts the cross-sectional dimension of the orifice of a still further alternative embodiment of the apparatus disclosed herein.
FIGS. 10 and 10A depict two further alternative embodiments of the apparatus disclosed herein, wherein each orifice has cuttable sections for affecting "treated" flow of the food material alternating between sections for affecting "non-treated" or "piping" flow of the food, the former sized for affecting increasingly larger cross-sectional dispensing holes, and the latter sized for affecting constant cross-sectional dispensing holes.

FIG. 9 shows a bottom view of a nozzle 210 according to this invention with a design for protrusions 234 extending inwardly from the inside wall 232 that has been found to be preferred.

FIG. 10 shows a nozzle 310 attached to bag 312, for dispensing food material 10A, which nozzle 310 is similar to the nozzle 110 shown in FIGS. 5-8, in that it has alternating internal profiles. The internal profiles of sections 310a, 310b and 310c are circular and the internal profiles of sections 310d and 310e are star shaped as a result of the internal protrusions 314a and 314b. Where the cut is made in nozzle 310 will alter the manner in which food material 10A is dispensed out of hole 320.

Figure 10A:
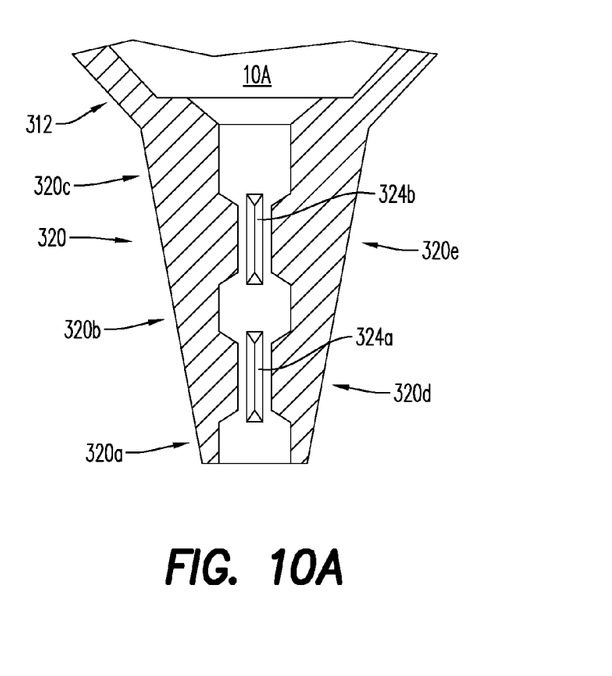

FIG. 10A shows a nozzle 320 attached to the bag 322, for dispensing food material 10A, which nozzle is similar to the nozzle 310 shown in FIG. 10 and the nozzle 110 shown in FIGS. 5-8, in that it has alternating internal profiles. The internal profiles of sections 320a, 320b and 320c are all circular and they all are of the same cross-sectional dimension. The internal profiles 320d and 320e have identically sized internal protrusions 324a and 324b and they are of the same cross-sectional dimension. Accordingly, during use, the user can select to make a cut at 320a for "un-treated" dispensing of the food material, and then to make a cut at 320d for effecting "treated" dispensing of the food material, and then another cut at 320b for the same "un-treated" dispensing as effected by section 320a, and then a cut at 320e for the same "treated" dispensing as affected by section 320d, and finally a cut at 320c for effecting the same "un-treated" dispensing as effected by sections 310a and 310b.

Figure 11:
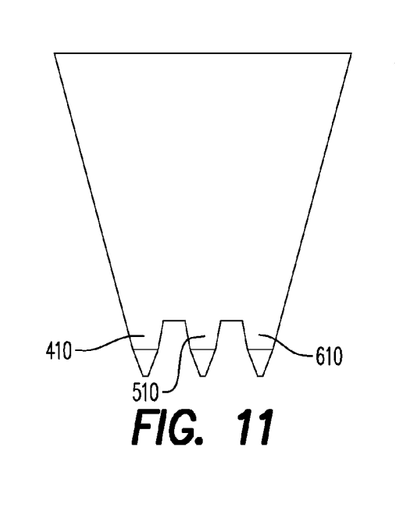
FIG. 11 depicts a multiple orifice alternative embodiment of the apparatus disclosed herein.
Figure 12:
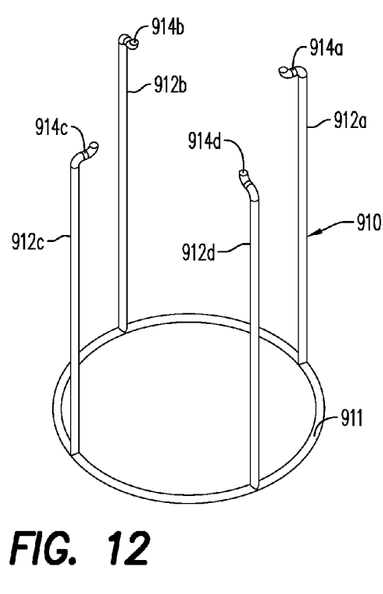
FIG. 12 depicts a perspective view of the wire stand.
Figure 13:
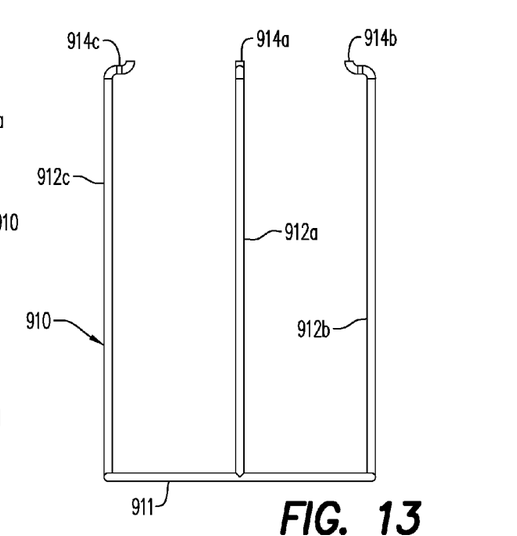
FIG. 13 depicts a side view of the wire stand of FIG. 12.
Figure 14:
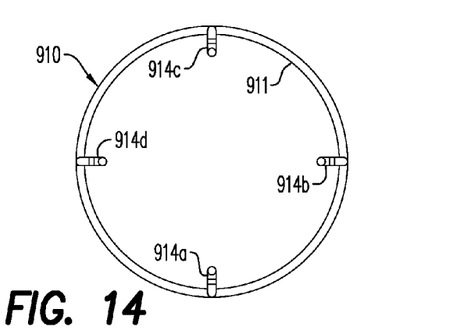
FIG. 14 depicts a top view of the wire stand of FIG. 12.
Figure 15:
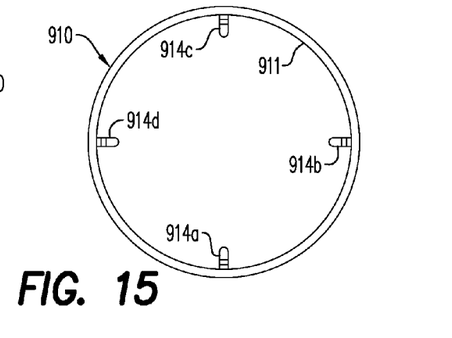
FIG. 15 depicts a bottom view of the wire stand of FIG. 12.

FIG. 11 shows a multiple outlet device with nozzles 410, 510 and 610 in accordance with this invention.

FIGS. 12-26 disclose various stands for use with the EFB apparatus during filling with food material.

Figure 16:
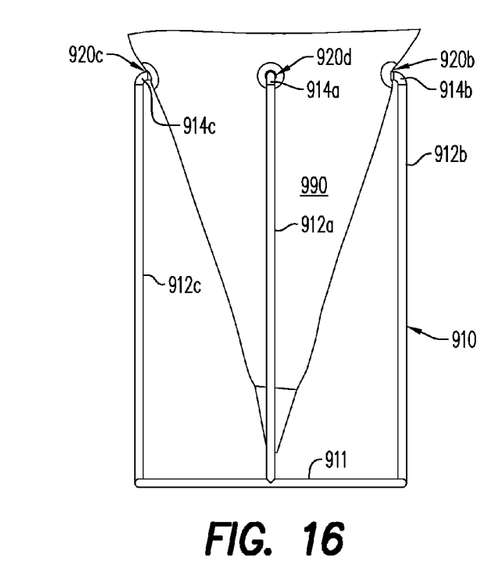
FIG. 16 depicts a side view of the wire stand of FIG. 12 in combination with the EFB apparatus of this invention shown mounted on the wire stand.
Figure 17:
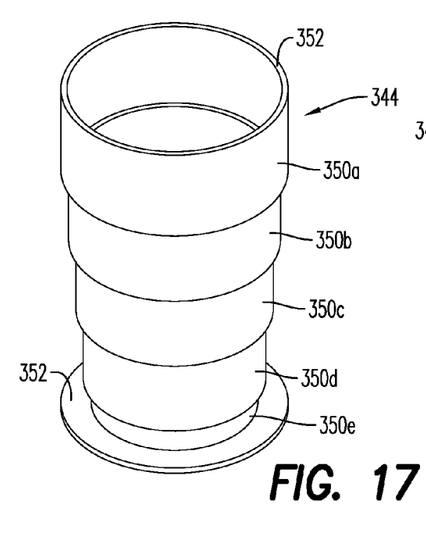
FIG. 17 depicts a collapsible annular stand for use in combination with an EFB apparatus of this invention.
Figure 18:
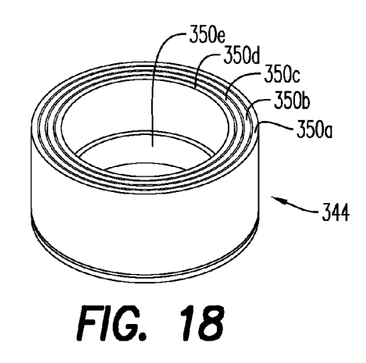
FIG. 18 depicts a perspective view of the collapsible annular stand of FIG. 17 in the collapsed position.
Figure 19:
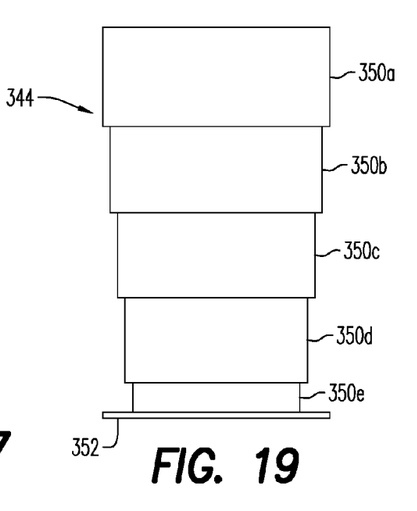
FIG. 19 depicts a side view of the collapsible annular stand of FIG. 17 in the expanded position.
Figure 20:
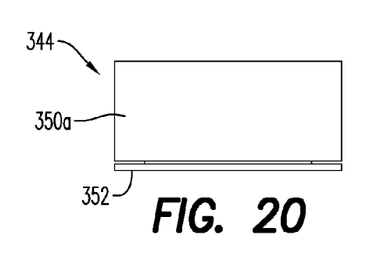
FIG. 20 depicts a side view of the collapsible annular stand of FIG. 17 in the collapsed position.

The stand shown in FIGS. 12-16 is a wire stand 910, shown with a base ring 911 and four extending support arms 912a, 912b, 912c and 912d. Each support arm has a support finger 914a, 914b, 914c and 914d for engaging (as shown in FIG. 16) corresponding to holes 920a, 920b, 920c (920d not shown) in the bag 990.

Figure 21:
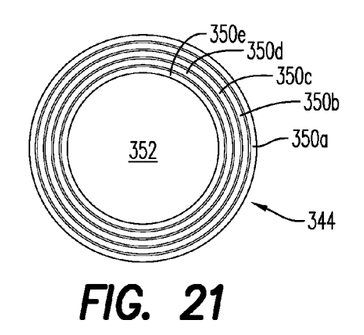
FIG. 21 depicts a top view of the collapsible annular stand of FIG. 17 in both the expanded and collapsed positions.
Figure 22:
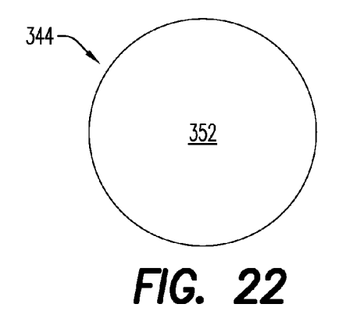
FIG. 22 depicts a bottom view of the collapsible annular stand of FIG. 17 in both the expanded and collapsed positions.
Figure 23:
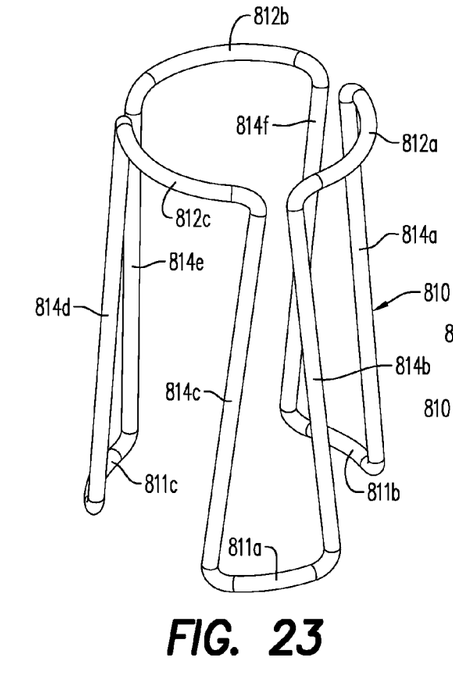
FIG. 23 depicts a tubular stand for use in combination with an EFB apparatus of this invention.
Figure 24:
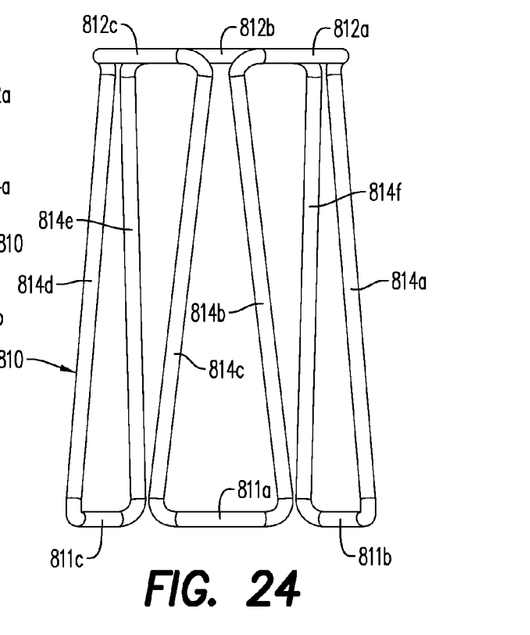
FIG. 24 depicts a side view of the tubular stand of FIG. 23.
Figure 25:
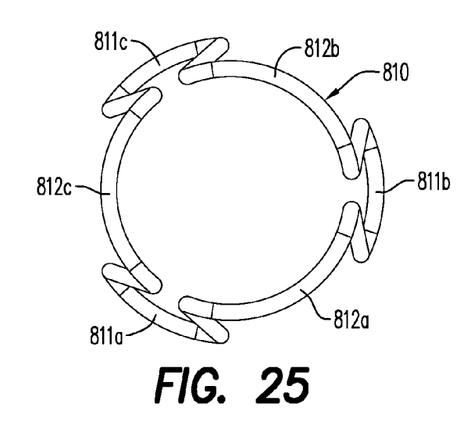
FIG. 25 depicts a top view of the tubular stand of FIG. 23.
Figure 26:
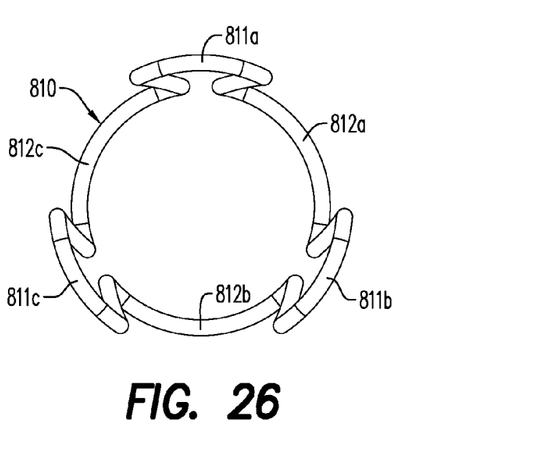
FIG. 26 depicts a bottom view of the tubular stand of FIG. 23.

The stand 344 shown in FIGS. 17-22 is a collapsible annular stand with a number of nesting sections 350a, 350b, 350c, 350d and 350e and a base 325. Stand 344 engages and supports the EFB bag during filling by having an excess amount of EFB bag material that is reversible on itself folded over the top edge 352 of section 350a. The stand 344 is "opened" by the user by pulling apart the outer nesting section 350a and the base 352. The stand remains "open" by friction or other means as would be commonly known in connection with such mechanisms. The stand is "collapsed" by the user pushing the outer nesting section 350a and the base 352 towards each other. The stand is shown "open" in FIGS. 17 and 19 and "collapsed" or "closed" in FIGS. 18 and 20. FIGS. 21 and 22 depict the stand in both the "open" and "closed" positions.

The stand shown in FIGS. 23-26 is a tubular stand 810, shown with three base sections 811a, 811b and 811c, three top sections 812a, 812b and 812c and six support legs 814a, 814b, 814c, 814d, 814e and 814f. Stand 810 engages and supports the EFB bag during filling by having an excess amount of EFB bag material that is reversible on itself folded over the top sections 812a, 812b and 812c.

Once the cut is made in a nozzle constructed in accordance with this invention, it remains possible to make a new cut, to enlarge the opening, without having to remove the food material from the bag and without having to take any other intermediary steps.

The design of the unique nozzle according to this invention allows the food material to be dispensed through the nozzle in a uniform, controlled and yet easy and effortless manner. Problems of lumps and clogs no longer cause the dispensation to have to be stopped to take time consuming remedial measures.

The dimensioning of the tip has been found to be critical. Slitted nozzle end designs of prior art devices may "give enough" to allow food to pass, but they are not capable of both widening out to enable desired passage of lumps and subsequently providing continued "treatment." Moreover, slitted ends can result in ribbons of food coming out the side of the nozzle hole when a lump is encountered. Further, slitted ends preclude the selection of a cut area anywhere along the longitudinal length of the conical nozzle. The longitudinally extending internal protrusions of this invention overcome such deficiencies.

The material used to manufacture the nozzle is critical. It cannot be rigid as with prior art devices as it will not allow lumps or clogs to be passed. At the same time, it must not be too elastic so that the nozzle has no "integrity" and thus no control of the flow of the food material.

A suitable elastic material in the embodiment where the nozzle is expected to flex and open would be either a thermoset elastomer, such as latex rubber or silicone rubber, or a thermoplastic elastomer, such as polyurethane. A suitable flexible but non-elastic material would be a thermoplastic such as polyethylene. These materials enable the user to clear clogs without taking the food out of the bag, either by expanding to allow the clog to pass (preferred), or by allowing the user to crush and break up the clog (alternative).

The nozzle should be made of a material of between 27A and 60A durometers, with 60A being the preferred embodiment.

In the preferred embodiment, the widest cut of the nozzle should yield a star shaped opening of up to 0.8 inches in inside diameter.

The cut lines can be notches as shown and can include colors and a color coded guide to help the user understand where to cut.

Figure 27:
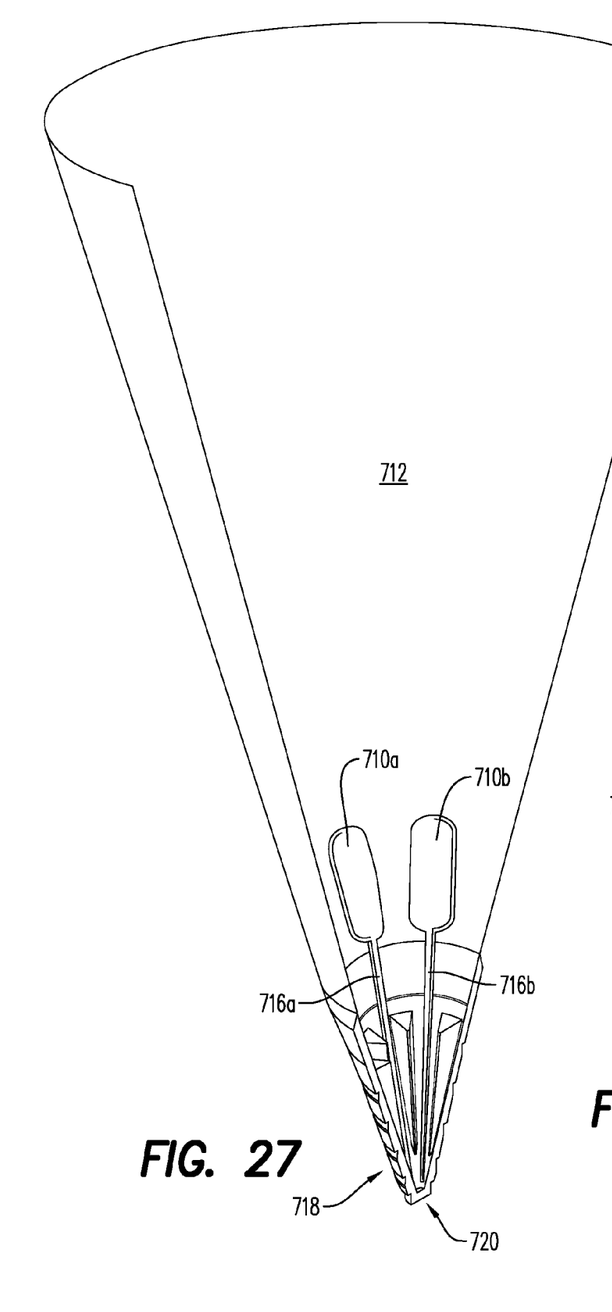
FIGS. 27 and 28 display the addition of color reservoirs to the EFB apparatus of this invention, that are either in the bag itself as shown in the former or in the orifice as shown in the latter.
Figure 28:
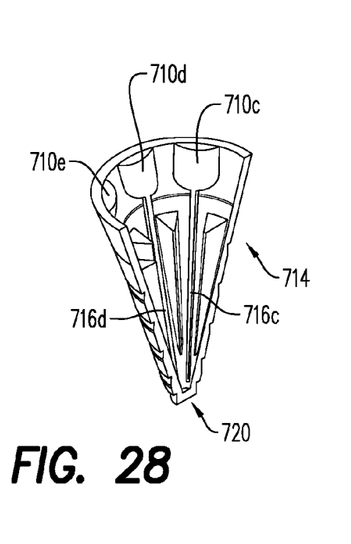

Referring to FIGS. 27 and 28, in order to introduce color into the food material as it is expelled, pre-positioned quantities of coloring agents can be manufactured into one or more reservoirs 710a and 710b in the bag 712 as shown in FIG. 27 or one or more reservoirs 710c, 710d and 710e in the nozzle 714 as shown in FIG. 28, such that pressure (as well as heat and moisture) from the food material (not shown) can activate the reservoirs 710 a-e and cause the simultaneous expulsion of the coloring agents. If the reservoirs 710a and 710b are located in the bag 712 (FIG. 27), tubes or piping 716a and 716b can lead from the reservoirs 710a and 710b down alongside the edge of the nozzle 718 to a closed end at the area of the end of the nozzle 720. Cutting the nozzle can simultaneously result in cutting of the color tubes or piping 716a and 716b. If the reservoirs 710c, 710d and 710e are located in the nozzle 714 (FIG. 28), tubes or piping 716c, 716d and 716e (not shown) can lead from the reservoirs 710c, 710d and 710e alongside the edge of the nozzle 714 to a closed end at the area of the end of the nozzle 720. Cutting the nozzle can simultaneously result in cutting of the color tubes or piping 716c, 716d and 716e.

Figures 29, 30:
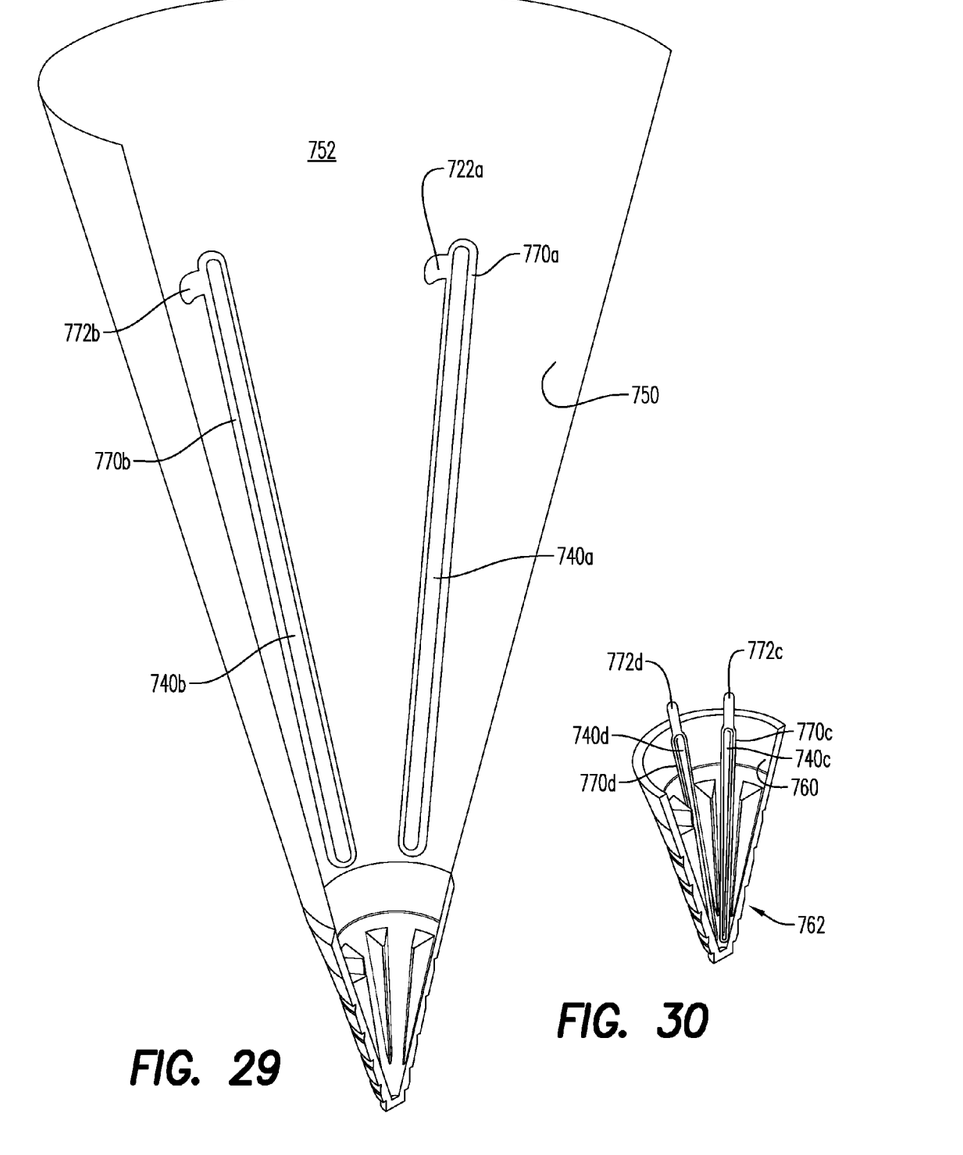
FIGS. 29 and 30 display the addition of color deposits to the EFB apparatus of this invention, that are covered with removable sealing strips and that are either in the bag itself as shown in the former or in the orifice as shown in the latter.

Referring to FIGS. 29 and 30, an alternate embodiment for introducing color into the food material as it is expelled is disclosed. Pre-positioned quantities of coloring agents can be placed in longitudinally extending deposits 740a and 740b on the internal surface 750 of the bag 752 as shown in FIG. 29 or placed in longitudinally extending deposits 740c and 740d on the internal surface 760 of the nozzle 762 as shown in FIG. 30. Prior to use, the integrity and viability of the color deposits, whether on the internal wall 750 of the bag 752, or on the internal wall 760 of the nozzle 762, is ensured by sealing strips 770a, 770b, 770c and 770d that overlay and seal the color deposits. Prior to depositing the food material in the bag 752, or prior to using the nozzle 762, in order to prepare the color deposits for "activation" by the passage of food material thereby, such sealing strips 770a, 770b, 770c and 770d are removed by pulling on tabs 772a, 772b, 772c and 772d, respectively, While the preferred embodiments of the invention have been shown and described, it will be apparent to those skilled in the art that changes and modifications may be made therein without departing from the spirit of the invention, the scope of which is defined by the appended claims.

What is claimed:

1. A one-piece completely disposable device for use in cooking, adapted for dispensing food material which contain lumps therefrom in a controlled manner for filling and decorating purposes, said device comprising: a one-piece envelope having: (A) a side wall; and (B) an integral, discharge orifice having an opening through which such food material can exit said envelope upon application of external pressure to said side wall; said orifice having: (i) an internal wall; and (ii) protrusions extending inwardly from said internal wall for treating such food material as said food material passes through said orifice upstream of said opening; said orifice being manufactured from an elastic material for allowing said orifice to be deformed in order to facilitate passage of such food material through said orifice despite the presence of lumps within such food material, and for the orifice to be able to apply a pressure to the lumps to break up the lumps, so that they pass through the orifice, and then the orifice returns to its original size and shape.

2. The device of claim 1, wherein said elastic material comprises a flexible material which allows said orifice to expand in order to pass the lumps within such food material through said opening and then allows said orifice to return to its original shape so as not to interfere with said protrusions.

3. The device of claim 1, wherein said elastic material comprises a malleable material which allows said orifice to be compressed upstream of said opening in order to break up the lumps within such food material and then allows said orifice to return to its original shape so as not to interfere with said protrusions.

4. A one-piece completely disposable device for use in cooking, adapted for dispensing food material therefrom in a controlled flow for filling and decorating purposes, said device comprising: a one-piece envelope having: (A) a side wall; and (B) an integral, discharge orifice having an opening through which such food material can exit said envelope upon application of external pressure to said side wall; said orifice having:
   (i) an internal wall; and (ii) protrusions extending inwardly from said internal wall for treating such food material as said food material passes through said orifice upstream of said opening;
   said orifice further having: (iii) an axis having a length and running parallel to a flow of such food material through said orifice; and (iv) varying cross sectional dimensions along a length of said axis; wherein said protrusions both: (a) extend inwardly from said internal wall in a direction perpendicular to said axis; and (b) run longitudinally in a direction parallel to said axis; said orifice being manufactured from an elastic material for allowing said orifice to be: (a) cut at points along the longitudinal axis of said orifice in order to permit a predetermined cross-sectional dimension of said orifice to be selected without interfering with an operation of said protrusions; and (b) deformed in order to facilitate passage of such food material through said orifice and out said opening despite the presence of lumps within such food material, and (c) configured to apply pressure to the lumps to break up the lumps so that they pass through the orifice, and then the orifice returns to its original size and shape.

5. The device of claim 4, wherein said elastic material comprises a flexible material which allows said orifice to expand in order to pass the lumps within such food material through said opening and then allows said orifice to return to its original shape so as not to interfere with said protrusions further operation of said treatment means.

6. The device of claim 4, wherein said elastic material comprises a malleable material which allows said orifice to be compressed upstream of said opening in order to break up the lumps within such food material in order to pass such broken up the lumps through said opening and then allows said orifice to return to its original shape so as not to interfere with said protrusions.

7. A one-piece completely disposable device for use in cooking, adapted for dispensing food material therefrom in a controlled flow for filling and decorating purposes, said device comprising: a one-piece elongated envelope having:
(A) a side wall; (B) a first end capable of being opened for inserting such food material into said envelope; and (C) a second end for dispensing such food material; said second end having an integral, discharge orifice with an opening through which such food material can exit said envelope upon application of external pressure to said side wall of said envelope; said orifice having: (i) an internal wall; and (ii) protrusions extending inwardly from said internal wall for treating such food material as it passes through said orifice upstream of said opening; said orifice being manufactured from an elastic material for allowing said orifice to be deformed in order to facilitate passage of such food material through such orifice despite the presence of the lumps within such food material, and for the orifice to be able to apply a pressure to the lumps to break up the lumps, so that they pass through the orifice, and then the orifice returns to its original size and shape.

8. The device of claim 7, said orifice further having: (iii) an axis having a length and running parallel to the flow of such food material through said orifice; and
(iv) varying cross sectional dimensions along the length of said axis; said protrusions comprising ridges that both: (a) extend inwardly from said internal wall in a direction perpendicular to said axis; and (b) run longitudinally in a direction parallel to said axis; wherein said orifice is capable of being cut at a number of points along its longitudinal axis to yield an exit opening or hole with a predetermined cross-sectional dimension or size; and wherein regardless of the point of cut, regardless of the size of the exit opening or hole, said inwardly extending ridges insure that the material is treated upstream of said opening before it is expelled from said envelope through said opening.

9. The device of claim 8, wherein said elastic material comprises a flexible material which allows said orifice to expand in order to pass the lumps within such food material through said opening and then allows said orifice to return to its original shape so as not to interfere with said protrusions.

10. The device of claim 8, wherein said elastic material comprises a malleable material used in the manufacture of said orifice which allows said orifice to be compressed upstream of said opening in order to break up the lumps within such food material in order to pass such broken up the lumps through said opening and then allows said orifice to return to its original shape so as not to interfere with said protrusions.

11. A one-piece completely disposable device for use by a user in cooking, adapted for dispensing food material therefrom in a controlled manner for filling and decorating purposes, said device comprising a one-piece, funnel-shaped bag having: (A) a side wall; (B) an open first end at the top or wider end of said funnel having a perimeter through which food material can be inserted into said bag; and (C) a closed second end at the bottom or narrow end of said funnel; said second end having an integral, malleable, conical shaped, discharge orifice having a length extending from said orifice's apex to said orifice's base; said orifice having: (i) an internal wall; and (ii) serrations or ridges extending inwardly from said internal wall and running longitudinally along the length of said orifice; said orifice being either initially closed or manufactured with an opening or hole; said orifice being made of an elastic material so as to be capable of being cut at any point along its longitudinal axis to yield an exit opening or hole with a predetermined size; said inwardly extending serrations or ridges insuring that such food material is treated as it is expelled from said bag through said orifice regardless of the size of the exit opening or hole; wherein said elastic material configured is to be (a) flexible and expandable in order to allow the hole or opening in said orifice to expand to pass clogs or lumps in such food material and then for said orifice to return to its original shape; or (b) malleable and deformable in order to allow said orifice to be compressed or collapsed upstream of said hole or opening so that the clogs or lumps can be broken up and then passed through said hole or opening and said orifice can return to its original shape.

12. The device of claim 11, wherein said side wall is made of a temperature impervious material, which allows the user to work with a variety of food materials, including warm and cold materials.

13. The device of claim 11, wherein said side wall has texturing to facilitate gripping by the user.

14. The device of claim 11 in combination with a stand that engages and supports said bag during filling.

15. The combination of claim 14, wherein said stand includes mating mechanisms as support means for engaging said bag about the perimeter of said first end of said bag.

16. The combination of claim 15, wherein said support means comprises fingers on said stand and said bag includes excess material about the perimeter of said first end of said bag, and said bag is supported by said stand by folding said excess material of said bag over said fingers of said stand.

17. The combination of claim 15, wherein said support means comprises fingers on said stand and said bag includes support holes about the perimeter of said first end of said bag, and said bag is supported by said stand by passing said fingers of said stand through said holes of said bag.

18. The device of claim 11, wherein said orifice has a star-shaped cross section along its longitudinal length.

19. The device of claim 11, wherein said orifice has an outside wall and cutting guides applied to said outside wall of said orifice along its length, indicated by scoring or coloring and corresponding to a preset orifice hole or exit opening size.

20. The device of claim 11, further including color delivery means inside said bag for allowing color to be added to the food material as it is forced out of said bag.

21. The device of claim 11, wherein said orifice is made out of material with a durometer of between 27A and 60A.

22. The device of claim 11, wherein said orifice is made out of a thermoset elastomer.

23. The device of claim 22, wherein said orifice is made out of latex rubber.

24. The device of claim 22, wherein said orifice is made out of silicone rubber.

25. The device of claim 11, wherein said orifice is made out of, such as a thermoplastic elastomer.

26. The device of claim 25, wherein said orifice is made out of polyurethane.

27. The device of claim 11, wherein said orifice is made out of a thermoplastic.

28. The device of claim 27, wherein said orifice is made out of polyethylene.

29. The device of claim 11, wherein said orifice can be cut to afford an opening with an internal diameter of up to 0.8 inches.

30. The device of claim 11, wherein said side wall is made from polyethylene so that it can be welded to said orifice.

31. A completely disposable device for use in cooking, adapted for attachment to a bag and for dispensing food material from such bag through such device in a controlled manner for filling and decorating purposes, said device comprising a malleable, conical shaped, discharge orifice having a length extending from said orifice's apex to said orifice's base;

said orifice having: (i) an internal wall; and (ii) serrations or ridges extending inwardly from said internal wall and running longitudinally along a length of said orifice; said orifice being either initially closed or manufactured with an opening or hole; said orifice being made of an elastic material so as to be capable of being cut at any point along its longitudinal axis to yield an exit opening or hole with a predetermined size; said inwardly extending serrations or ridges insuring that such food material is treated as it is expelled from such bag through said orifice regardless of the size of the exit opening or hole; wherein said orifice is configured to be: (a) flexible and expandable in order to allow the hole or opening in said orifice to expand to pass clogs or lumps in such food material and then for said orifice to return to its original shape; or (b) malleable or deformable in order to allow said orifice to be compressed or collapsed "upstream" of said hole or opening so that the clogs or lumps can be broken up and then passed through said hole or opening and said orifice can return to its original shape.

32. The device of claim 31, wherein said orifice is made out of a thermoset elastomer.

33. The device of claim 32, wherein said orifice is made out of latex rubber.

34. The device of claim 32, wherein said orifice is made out of silicone rubber.

35. The device of claim 31, wherein said orifice is made out of a thermoplastic elastomer.

36. The device of claim 35, wherein said orifice is made out of polyurethane.

37. The device of claim 31, wherein said orifice is made out of a thermoplastic.

38. The device of claim 37, wherein said orifice is made out of polyethylene.

39. The device of claim 31, wherein said orifice has a star-shaped section along its longitudinal length.

40. The device of claim 31, wherein said orifice has a star-shaped cross section along portions of its longitudinal length.

41. The device of claim 31, wherein said orifice has an outside wall and cutting guides applied to said outside wall of said orifice along its length, indicated by scoring or coloring and corresponding to a preset orifice hole or exit opening size.

42. The device of claim 31, further including at least one color tube as a color delivery means inside said orifice for allowing color to be added to the food material as it passes through said orifice.

\* \* \* \* \*